(12) United States Patent
Shi et al.

(10) Patent No.: US 9,856,919 B2
(45) Date of Patent: Jan. 2, 2018

(54) BEARING LIMITING SYSTEM AND LIMITING METHOD

(71) Applicant: BEIJING GOLDWIND SCIENCE & CREATION WINDPOWER EQUIPMENT CO., LTD., Beijing (CN)

(72) Inventors: Hongkui Shi, Beijing (CN); Yongjun Guo, Beijing (CN); Jianqiu Yang, Beijing (CN)

(73) Assignee: BEIJING GOLDWIND SCIENCE & CREATION WINDPOWER EQUIPMENT CO., LTD.

( * ) Notice: Subject to any disclaimer, the term of this patent is extended or adjusted under 35 U.S.C. 154(b) by 64 days.

(21) Appl. No.: 14/907,976

(22) PCT Filed: Dec. 10, 2014

(86) PCT No.: PCT/CN2014/093492
§ 371 (c)(1),
(2) Date: Jan. 27, 2016

(87) PCT Pub. No.: WO2015/103916
PCT Pub. Date: Jul. 16, 2015

(65) Prior Publication Data
US 2016/0178012 A1    Jun. 23, 2016

(30) Foreign Application Priority Data
Jan. 10, 2014 (CN) .......................... 2014 1 0012557

(51) Int. Cl.
*F16C 35/063* (2006.01)
*F16C 19/26* (2006.01)

(52) U.S. Cl.
CPC ............ *F16C 35/063* (2013.01); *F16C 19/26* (2013.01)

(58) Field of Classification Search
CPC .......... F16C 19/06; F16C 19/08; F16C 19/26; F16C 19/28; F16C 35/063; F16C 35/073
See application file for complete search history.

(56) References Cited

U.S. PATENT DOCUMENTS

| 4,381,874 | A | 5/1983 | Strader |
| 6,261,061 | B1 * | 7/2001 | Pfaffenberger ......... F01D 25/16 384/492 |

(Continued)

FOREIGN PATENT DOCUMENTS

| CN | 1783659 A | 6/2006 |
| CN | 201412446 Y | 2/2010 |

(Continued)

OTHER PUBLICATIONS

First Chinese Office Action dated Oct. 8, 2015; Appln. No. 201410012557.7.

(Continued)

*Primary Examiner* — Phillip A Johnson
(74) *Attorney, Agent, or Firm* — Ladas & Parry LLP

(57) ABSTRACT

Disclosed is a bearing limiting system. The limiting system comprises a limiting bulge formed integrally with a shaft, a bearing inner race, and an acting force conduction part, wherein the acting force conduction part is arranged between the limiting bulge and the bearing inner race, and the inner diameter of the bearing inner race is larger than the outer diameter of the limiting bulge. The bearing limiting system is convenient in installation, can realize the effective limiting of a bearing inner race while not affecting either the strength of the shaft or the assembly and disassembly of the bearing, and is especially suitable for a bearing with a long shaft.

13 Claims, 3 Drawing Sheets

(56) References Cited

U.S. PATENT DOCUMENTS

| | | | |
|---|---|---|---|
| 9,103,373 B1 * | 8/2015 | Kolar | F16C 35/073 |
| 2009/0050091 A1 | 2/2009 | Watanabe et al. | |
| 2009/0078525 A1 | 3/2009 | Schumacher et al. | |

FOREIGN PATENT DOCUMENTS

| | | | | |
|---|---|---|---|---|
| CN | 201972840 U | | 9/2011 | |
| CN | 202091376 U | | 12/2011 | |
| CN | 102728683 A | | 10/2012 | |
| CN | 203202019 A | | 9/2013 | |
| CN | 103807300 A | | 5/2014 | |
| CN | 203685864 U | | 7/2014 | |
| DE | 102007050201 A1 | | 4/2009 | |
| DE | 102008025595 A1 | | 12/2009 | |
| FR | 2934654 A1 | | 2/2010 | |
| FR | 2949138 A1 | | 2/2011 | |
| GB | 628288 A | * | 8/1949 | F16B 21/18 |
| JP | 60236802 A | * | 11/1985 | F16C 35/063 |
| JP | 62171521 A | * | 7/1987 | F16C 35/073 |
| JP | 3661227 B2 | * | 6/2005 | F16C 35/063 |
| JP | 2006-077925 A | | 3/2006 | |
| JP | 2006300324 A | * | 11/2006 | F01D 25/16 |
| JP | 2010121663 A | * | 6/2010 | F16C 35/063 |
| WO | 2009/049980 A1 | | 4/2009 | |

OTHER PUBLICATIONS

Extended European Search Report dated Jan. 31, 2017; Appln. 14877768.3-1751/3043081 PCT/CN2014093492.

International Search Report dated Mar. 11, 2015; PCT/CN2014/093492.

Second Chinese Office Action dated Dec. 12, 2016; Appln. No. 201410515814.9.

* cited by examiner

BEARING LIMITING SYSTEM AND LIMITING METHOD

CROSS-REFERENCE TO RELATED APPLICATION

This application is the National Stage of international Application No. PCT/CN2014/093492, filed Dec. 10, 2014, which claims the benefit of priority to Chinese Patent Application No. 201410012557.7 titled "BEARING LIMITING SYSTEM AND LIMITING METHOD", filed with the Chinese State Intellectual Property Office on Jan. 10, 2014, the entire disclosures of which are incorporated herein by reference.

TECHNICAL FIELD

This application relates to a hearing position-limiting system and a position-limiting method.

BACKGROUND

In the conventional technology, limitation to a bearing inner race at one side is typically implemented by providing a shaft shoulder on a shaft, and the technique of limitation to the bearing inner race at the other side mainly includes the following kinds. One kind is to provide a groove or screw threads on the shaft, and secure a position-limiting component via this groove or the screw threads, and then limit the bearing by the position-limiting component; another kind is to limit the bearing by an interference fit; the third kind is to limit the bearing by adhesion; and the fourth kind is to mount a shaft cap on a shaft end.

The position limiting implemented by the interference fit and the adhesion have low reliability. Providing the groove or the screw threads on the shaft to limit the bearing inner race may reduce the strength of the shaft, thereby affecting the performance and the operation safety of the entire mechanical equipment. The method of mounting a shaft cap on a shaft end is not applicable to a bearing mounted on a long shaft. For the bearing mounted on the long shaft, the long shaft is generally designed to be a tapered shape, and an end of the shaft far away from the load end generally has a small shaft diameter.

SUMMARY

In order to eliminate the defects in the conventional technology such as low reliability, affecting the strength of the shaft and further affecting the performance and operation safety of the mechanical equipment, and inapplicable to a bearing mounted on a long shaft, a bearing position-limiting system and a position-limiting method are provided according to the present application.

According to an aspect of the present application, a bearing position-limiting system is provided according to the present application, which includes a position-limiting projection, a bearing inner race and a force transferring part arranged between the position-limiting projection and the bearing inner race. An inner diameter of the bearing inner race is larger than an outer diameter of the position-limiting projection.

According to another aspect of the application, a bearing position-limiting method is provided, which includes: applying a radial action force to a bearing inner race along a shaft at a mounting position of a bearing to a proximal end from a distal end by taking an position-limiting projection integrally formed with the shaft as a force application point, wherein an outer diameter of the position-limiting projection is smaller than an inner diameter of the bearing inner race.

At least the following beneficial effects are achieved by the embodiments of the present application.

The bearing position-limiting system according to the embodiments of the present application is convenient for installation, and is capable of achieving effective position-limiting to the bearing inner race without affecting the strength of the shaft and interfering the assembly and disassembly of the bearing, and is particularly applicable to the hearing mounted on a long shaft. The bearing position-limiting method according to the embodiments of the present application is easy to operate, and has low requirement to the operating environment and capability of the operators.

BRIEF DESCRIPTION OF THE DRAWINGS

The above and other objects and features of the present application will be further described clearly by means of the following description in conjunction with the drawings, in which.

REFERENCE NUMERALS IN THE DRAWINGS

1—position-limiting projection,
2—bearing inner race,
3—force transferring part,
4—first rigid component,
5—second rigid component,
6—connecting component,
7—stuck part,
8—bolt,
a—bolt hole,
b—through slot,
c—half through slot.

DETAILED DESCRIPTION

The bearing position-limiting system according to the embodiments of the present application is applicable to a bearing mounted on a long shaft, and the long shaft is in a tapered shape, and an end of the shaft far away from a load end has a smaller shaft diameter. In the present application, an end which is far away from the load end and has a small shaft diameter is defined as a distal end, and an end which is close to the load end and has a large shaft diameter is defined as a proximal end. A set of bearing position-limiting system is designed according to the present application just by utilizing the feature that the long shaft is in the tapered shape.

A first embodiment is described hereinafter.

Figure 1:
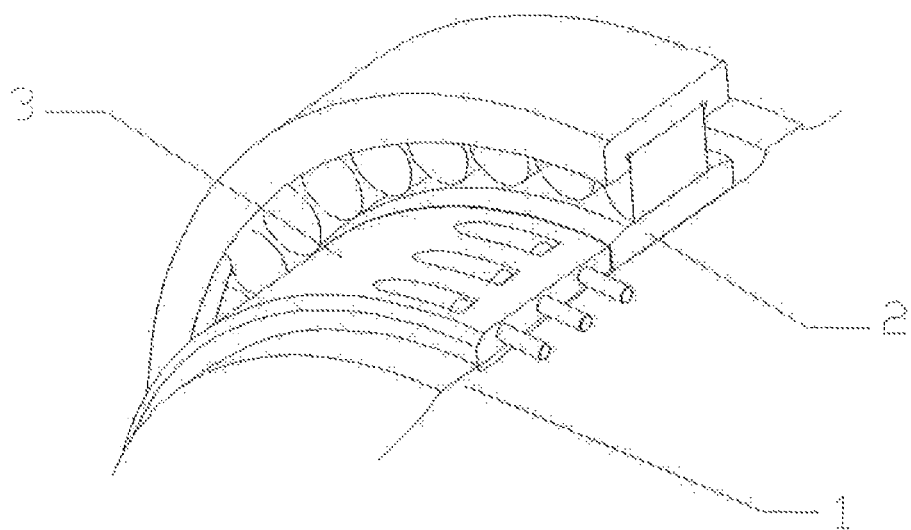
FIG. 1 is a first schematic view showing the structure of a bearing position-limiting system according to an embodiment of the present application.

As shown in FIG. 1, which is a first schematic view showing the structure of the bearing position-limiting system according to an embodiment of the present application, the bearing position-limiting system according to the embodiment includes a position-limiting projection 1, a bearing inner race 2 and a force transferring part 3. The force transferring part 3 is arranged between the position-limiting projection 1 and the bearing inner race 2, and an inner diameter of the bearing inner race 2 is larger than an outer diameter of the position-limiting projection 1. Preferably, the position-limiting projection 1 is integrally formed with a shaft.

Specifically, the position-limiting projection 1 is located at a certain distance from a bearing mounting position, and the force transferring part 3 abuts against the position-limiting projection 1 and the bearing inner race 2, thus transferring the position-limiting action of the position-limiting projection 1 to the bearing inner race 2. Preferably, the force transferring part 3 is a ring-shaped structure, and an inner diameter of the force transferring part 3 at a side close to the position-limiting projection 1 is smaller than the outer diameter of the position-limiting projection 1, thus, the force transferring part 3 can abut against the position-limiting projection 1. The position-limiting projection 1 may be in a shape of a projected baffle ring integrally formed with the shaft.

Further, in order to ensure the assembly and disassembly of a bearing outer race and a roller are not affected, the inner diameter of the bearing inner race 2 may be smaller than a maximum outer diameter of the force transferring part 3, and an outer diameter of the bearing inner race 2 may be larger than the maximum outer diameter of the force transferring part 3.

The force transferring part 3 may be at least one integrally formed circular ring and/or at least one multi-piece split circular ring. The force transferring part 3 may be an elastic component and/or a rigid component. If the force transferring part 3 is an elastic component, the elastic component may be mounted between the position-limiting projection 1 and the bearing inner race 2 from an end, having a small diameter, of the long shaft with the aid of the elasticity. If the force transferring part 3 is a rigid component, the force transferring part 3 may also be mounted between the position-limiting projection 1 and the bearing inner race 2 from the end, having a small shaft diameter, of the long shaft after being heated, and then the force transferring part 3 can abut against the position-limiting projection 1 and the bearing inner race 2 after being cooled. In practical applications, however, the force transferring part 3 is preferably a structure spliced by multiple pieces in a circumferential direction, i.e., a multi-piece snapping circular ring. Thus, there is no need to mount the spliced structure along an axial direction. As shown in FIG. 1, the force transferring part 3 is a split fixed ring formed by two opposite pieces. After the bearing inner race is mounted, the split fixed ring formed by two opposite pieces is mounted between the projection 1 and the bearing inner race 2, and threaded holes are provided at the joints of the fixed ring, and the two pieces are connected by a hexagon socket-head bolt.

In the bearing position-limiting system according to the embodiment, the position-limiting projection is designed on the long shaft to have an outer diameter not larger than the inner diameter of the bearing inner race, and the force transferring part transfers the position-limiting action to the bearing inner race, effectively and mechanically securing the bearing inner race without affecting the assembly of the bearing inner race and the strength of the long shaft.

A second embodiment is described hereinafter.

Figure 2:
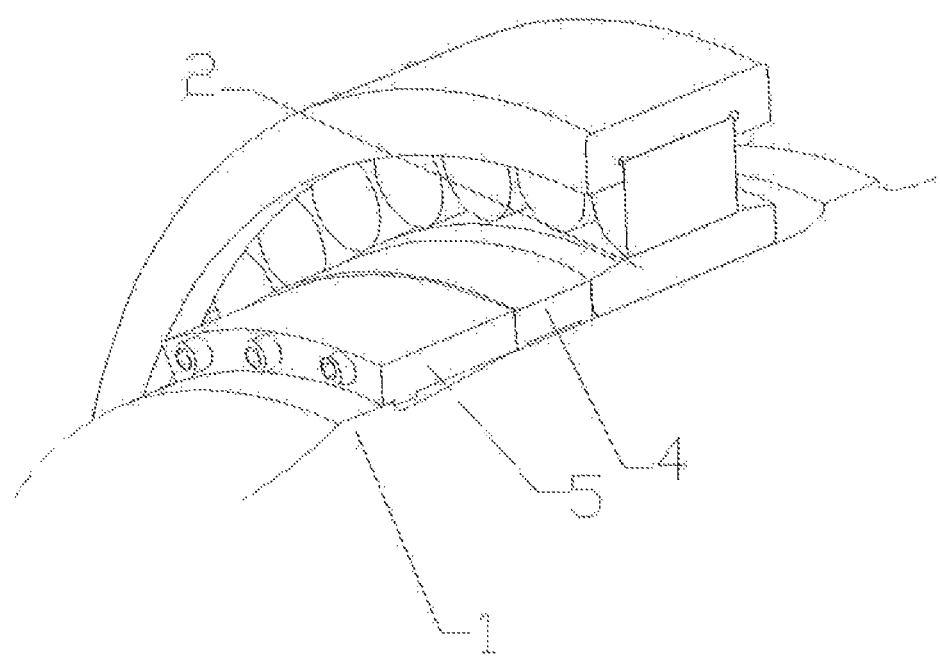
FIG. 2 is a second schematic view showing the structure of the bearing position-limiting system according to the embodiment of the present application.
Figure 4:
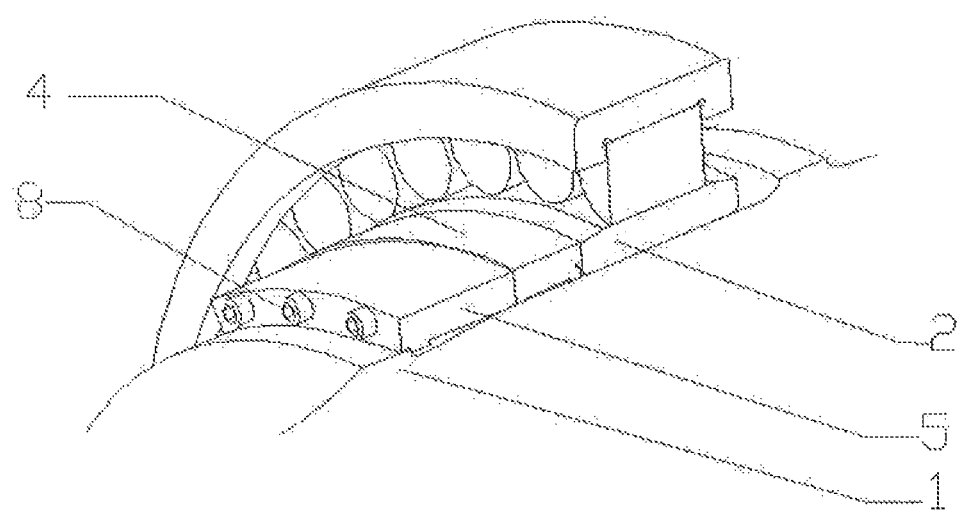
FIG. 4 is a fourth schematic view showing the structure of the bearing position-limiting system according to the embodiment of the present application.

As shown in FIG. 2, which is a second schematic view showing the structure of the bearing position-limiting system according to a second embodiment of the present application, the difference between the second embodiment and the first embodiment lies in that the force transferring part 3 includes a first rigid component 4 and a second rigid component 5. Specifically, the first rigid component 4 is located close to the bearing inner race 2, and the second rigid component 5 is located close to the position-limiting projection 1. Preferably, the first rigid component 4 is a rigid ring mounted on the shaft by an interference fit (i.e., the first rigid component is an interfering ring) and abuts against the bearing inner race 2. The second rigid component 5 may also be the same as that in the first embodiment, which is in a form of a two-piece or multi-piece split fixed ring. As shown in FIG. 4, the first rigid component 4 and the second rigid component 5 may be connected together by a bolt 8. Specifically, threaded holes may be provided in the first rigid component 4 in the axial direction, in addition, the threaded holes may also be provided correspondingly on the second rigid component 5 in the axial direction. The first rigid component 4 and the second rigid component 5 are connected together by the bolt 8 so as to form a single piece, and finally the second rigid component 5 abuts against the position-limiting projection 1.

The interfering ring prevents an axial movement of the bearing inner race by means of the interference fit, however, this method still has a risk of failure. Thus, a two-piece split fixed ring is further provided to cooperate with the interfering ring, which effectively prevents the failure of the interfering ring, and further effectively prevents the axial movement of the bearing inner race.

A third embodiment is described hereinafter.

Figure 3:
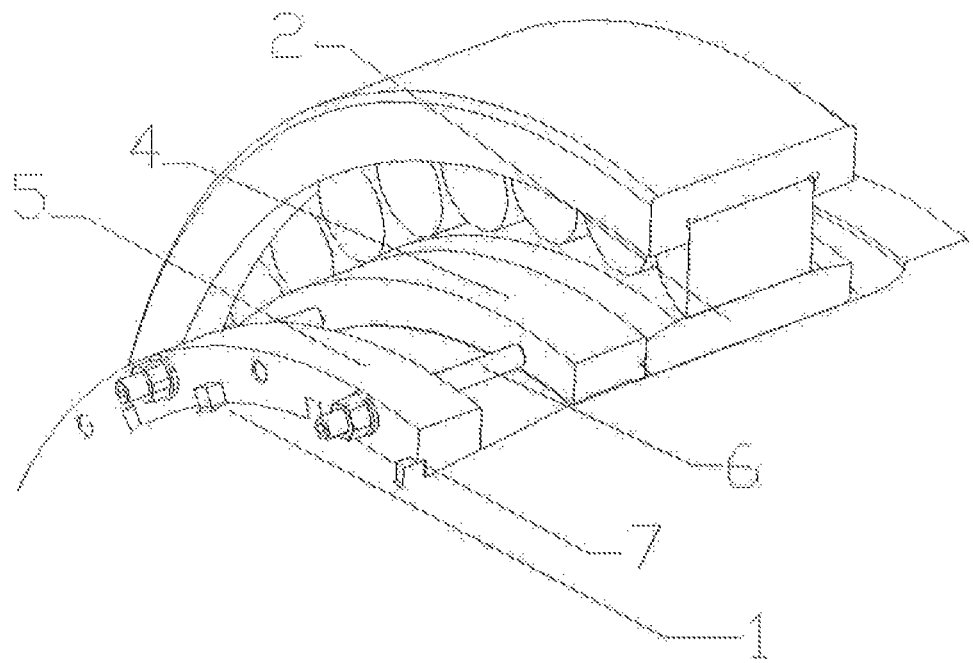
FIG. 3 is a third schematic view showing the structure of the bearing position-limiting system according to the embodiment of the present application.

As shown in FIG. 3, which is a third schematic view showing the structure of the hearing position-limiting system according to a third embodiment of the present application, the difference between the third embodiment and the second embodiment lies in that the first rigid component (i.e. the interfering ring) 4 is located at a certain distance from the second rigid component 5, and the first rigid component 4 and the second rigid component 5 are connected together by a connecting component 6, and specifically, the connecting component 6 may be a bolt. In an using process, the second rigid component 5 is mounted after the bearing and the first rigid component 4 are mounted, and the first rigid component 4 and the second rigid component 5 are connected by the bolt passing through both of them, and are secured by a nut finally. In this way, a certain gap exists between the first rigid component 4 and the second rigid component 5, which ensures that the second rigid component 5 can be mounted on the shaft smoothly, and also saves the material of the bearing position-limiting component. As with the above embodiments, the second rigid component 5 may also be in a form of a two-piece or multi-piece split fixed ring same with that in the first embodiment. As a further improvement to this embodiment, the first rigid component (i.e., interfering ring) 4 may be dispensed, and only the second rigid component 5 is left, thus, the second rigid component 5 directly abuts against the bearing inner race by the bolt connecting with the second rigid component 5.

A fourth embodiment is described hereinafter.

This embodiment mainly refers to a further improvement to the position-limiting projection 1, as shown in FIG. 3. The position-limiting projection 1 may be in a form of one or more projected blockers arranged in a circumferential direction, and the outer diameter of the position-limiting projection 1 is generally smaller than (at least not larger than) the inner diameter of the bearing inner race 2, which ensures that the assembly and disassembly of the bearing inner race 2 are not affected. Each of the projected blockers may be in a square shape (a square shape as shown in the drawings) or in a circular-arc shape.

Figure 5:
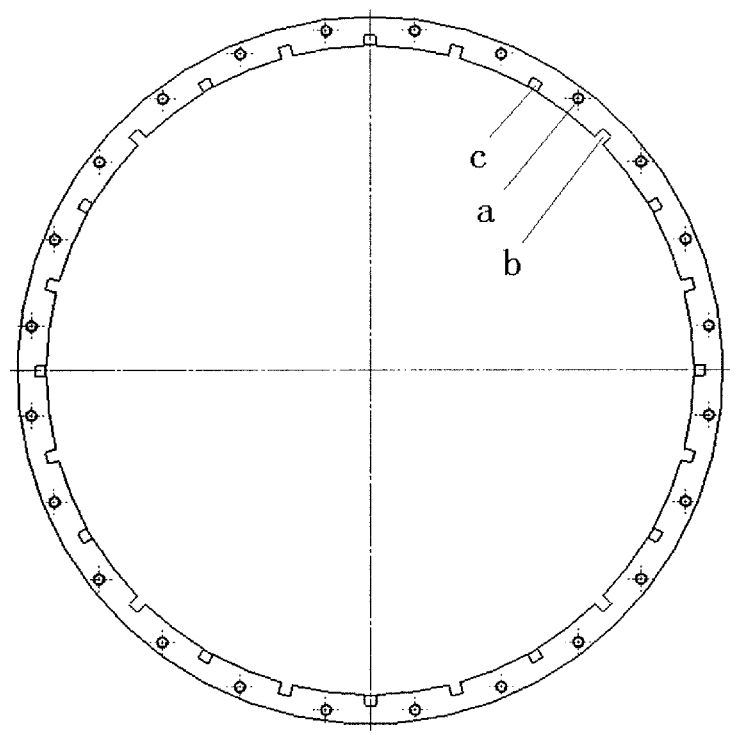
FIG. 5 is a first cross-sectional schematic view showing the structure of a rigid ring of the bearing position-limiting system according to the embodiment of the present application.
Figure 6:
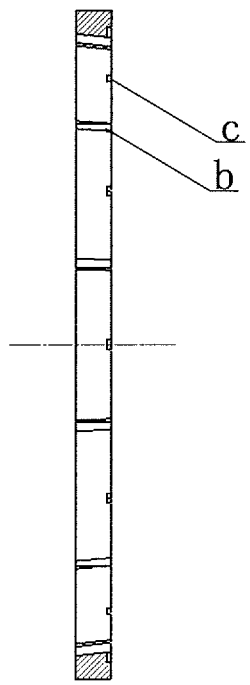
FIG. 6 is a second cross-sectional schematic view showing the structure of the rigid ring of the bearing position-limiting system according to the embodiment of the present application.

If the blockers are provided on the shaft, the entire force transferring part 3 or the second rigid component 5 may be designed as a rigid ring with a particular structure, and the rigid ring is a tapered ring-shaped structure (as shown in FIG. 6) which conforms to the profile of the shaft. The rigid ring is provided with one or more through slots and one or more half through slots (i.e., a stuck part 7, as shown in FIG. 3) which match the blockers on the shaft in size and number, and the rigid ring is also provided with the threaded holes in the axial direction. The outer diameter of the rigid ring should not be larger than the outer diameter of the bearing inner race, which ensures that the rigid ring does not affect the assembly and disassembly of the bearing outer race and the roller. FIG. 5 is a first cross-sectional schematic view showing the structure of a rigid ring according to the fourth embodiment of the present application (taken along the plane where the circumference is located), and FIG. 6 is a second cross-sectional schematic view showing the structure of the rigid ring according to the fourth embodiment of the present application (taken along the plane where the axis is located). As shown in FIGS. 5 and 6, the rigid ring shown in the drawings is provided with a through slot b, a half through slot c and a bolt hole a.

Taking the structure shown in FIG. 3 as an example, the second rigid component 5 is designed to be a rigid ring having a particular structure, and is in cooperation with the interfering ring as the first rigid component 4, so as to achieve position limitation. The mounting process is as follows. The second rigid component 5 is mounted after the interfering ring is mounted, and firstly, the through slot b is aligned with one of the projected blockers on the shaft, and after the second rigid component 5 is completely pushed to a right side of the projected blocker on the shaft, the second rigid component 5 is rotated by a certain angle so as to allow the half through slot c on the second rigid component 5 to be aligned with the projected blocker on the shaft, and then the baffle ring is moved leftward, which allows the projected blocker to abut against the half through slot c. In addition, as a further improvement, the half through slot c may also be designed to be an L shape to prevent the rigid ring from moving towards the shaft end continually.

After the second rigid component 5 is mounted, the bolt 8 as a connecting component 6 is screwed into the threaded hole a. The bolt 8 may be a hexagon socket flat-ended bolt, and multiple bolts 8 may be provided and the number of the bolts 8 screwed-in can be selected based on the outer diameter of the shaft. After the bolt 8 is screwed, the flat end of the bolt abuts against the first rigid component 4, and then the bolt 8 is rotated continually. Since the second rigid component 5 also has screw threads, rotating the bolt 8 continually would push the second rigid component 5 to move leftward until the projected blocker on the shaft abuts against the half through slot c in the second rigid component 5, thus the entire system is pressed tightly, and when the bolt 8 is rotated in place, a washer and a nut may be mounted for the final securing.

The technical solutions of the present application are introduced by the above four embodiments, and improvements adopted in various embodiments may also be combined mutually. Therefore, in general, the various variants for the above embodiments are summarized as follows. The rigid ring may not only solely act as the force transferring part 3, specifically, one end of the rigid ring is engaged with the blockers, and the other end of the rigid ring is connected to the bearing inner race, but also form the force transferring part 3 together with at least another rigid component, and the rigid ring (i.e., the second rigid component 5) as one end of the force transferring part is engaged with the blockers, the other rigid ring (i.e., the first rigid component 4) as the other end of the force transferring part abuts against the bearing inner race. The second rigid component 5 and the first rigid component 4 may not abut directly, but by a connecting component 6. As long as a structure may achieve applying an axial acting force along the shaft to the bearing inner race 2 to a proximal end from a distal end and take the position-limiting projection 1 as a force application point, the intended object of the present application can be achieved by the structure.

As an implementation, an elastic component (e.g., a spring) may also be provided between the projected blockers or the projected baffle ring (i.e., the position-limiting projection 1) and the bearing inner race 2 as an implementation of the three transferring part 3. The elastic component has two ends respectively in connection with the position-limiting projection 1 and the bearing inner race 2. Alternatively, the elastic component is only a portion of the force transferring part 3, and forms the force transferring part 3 together with other rigid components. For example, one end of the elastic component is in connection with the position-limiting projection 1, and the other end of the elastic component is in connection with the rigid ring mounted with the interference fit on the shaft, and the interfering rigid ring is in connection with the bearing inner race. Thus, the limitation to the bearing inner race 2 is achieved by taking the position-limiting projection 1 as a force application point.

As an implementation, the split rigid ring formed by the two opposite pieces may be mounted between the position-limiting projection 1 and the bearing inner race 2, and one or more threaded holes are designed in the two opposite pieces so as to connect the two split opposite pieces to form an entire circle, further, one or more threaded holes are designed in the rigid ring in the axial direction. An inner diameter of the rigid ring is in an clearance fit with the shaft such that the rigid ring is movable along the shaft, meanwhile an outer diameter of the rigid ring is not larger than the outer diameter of the bearing inner race 2, which ensures that the rigid ring does not interfere the assembly and disassembly of the bearing outer ring and the roller.

After the bearing inner race 2 is assembled, the split rigid ring formed by the two opposite pieces may then be mounted. After the split two pieces are connected into the entire circle by the bolt, the hexagon socket set screw with flat point is screwed into the threaded hole of the rigid ring. The set screw is screwed until the set screw abuts against the hearing inner race 2, at this time, the set screw is screwed continually such that the rigid ring moves towards the shaft end until the rigid ring abuts against the position-limiting projection 1. For example, the half through slot on the rigid ring completely abuts against the blocker on the shaft, thus completely securing the bearing inner race 2. In such a case, a washer and a nut are mounted on the set screw, thereby achieving the limitation and securing to the bearing inner race 2.

In the above embodiments, an interfering ring may also be additionally mounted between the bearing inner race 2 and the rigid ring. After the bearing is, the interfering ring is mounted to abut against the bearing, in such a case, the set screw is allowed to abut against the interfering ring to achieve redundancy mechanical securing to the bearing inner race 2. Apparently, those skilled in the art may appreciate that adding the interfering ring based on other embodiments is advantageous to the object of the present application. For example, after the interfering ring (i.e., the first rigid component 4) is provided to abut against the bearing inner race 2, the second rigid component 5 is provided between the interfering ring and the position-limiting projection on the shaft, and the second rigid component 5 is secured to the interfering ring by the bolt. In such a case, the second rigid component 5 may be an arc-shaped steel block adapted to the long shaft of an axle. In the case that the position-limiting projection 1 on the shaft is in a form of multiple projected blockers, corresponding number of arc-shaped steel blockers may be provided, and an independent arc-shaped steel blocker is provided between each position-limiting projected blocker and the interfering ring. The arc-shaped steel blockers may also be less than the position-limiting projected blockers. That is to say, some adjacent arc-shaped steel blockers arranged between multiple position-limiting projected blockers and the interfering ring are integrally formed. In the case that the position-limiting projection 1 is a projected ring, the number of the arc-shaped steel blocks may be selected according to practical requirements.

There may be a variety of solutions for the design of the projected blocker, in addition to the square blocker, the projected blocker may also be in a circular arc shape, or may not be the scattered blockers but may be designed as a baffle ring in an entire circle shape. The shape of the through slot and the shape of the half through slot on the rigid ring may also be changed correspondingly.

Although the present application has been represented and described with reference to the preferred embodiments, it should be understood that, for the person skilled in the art, various modification and variations may be made to these embodiments without departing from the spirit and the scope of the present application defined by appended claims.

The invention claimed is:

1. A bearing limiting system, comprising a position-limiting projection, a bearing inner race, and a force transferring part arranged between the position-limiting projection and the bearing inner race, wherein an inner diameter of the bearing inner race is larger than an outer diameter of the position-limiting projection,
wherein the force transferring part is a rigid component, which comprises a first rigid component and a second rigid component, the first rigid component is located close to the bearing inner race, the second rigid component is located close to the position-limiting projection.

2. The bearing position-limiting system according to claim 1, wherein the position-limiting projection is integrally formed with a shaft.

3. The bearing position-limiting system according to claim 2, wherein the force transferring part abuts against the position-limiting projection and the bearing inner race.

4. The bearing position-limiting system according to claim 2, wherein the inner diameter of the bearing inner race is smaller than a maximum outer diameter of the force transferring part, and an outer diameter of the bearing inner race is larger than the maximum outer diameter of the force transferring part.

5. The bearing position-limiting system according to claim 1, wherein the force transferring part abuts against the position-limiting projection and the bearing inner race.

6. The bearing position-limiting system according to claim 1, wherein the inner diameter of the bearing inner race is smaller than a maximum outer diameter of the force transferring part, and an outer diameter of the bearing inner race is larger than the maximum outer diameter of the force transferring part.

7. The bearing position-limiting system according to claim 1, wherein a connecting component is provided between the first rigid component and the second rigid component for connecting the first rigid component and the second rigid component.

8. The bearing position-limiting system according to claim 1, wherein the first rigid component is a rigid ring mounted on the shaft by an interference fit and abutting against the bearing inner race.

9. The bearing position-limiting system according to claim 1, wherein the second rigid component is provided with a stuck part cooperated with the position-limiting projection.

10. The bearing position-limiting system according to claim 9, wherein the position-limiting projection is in a form of a plurality of projected blockers arranged along the circumference, and the second rigid component is a tapered ring-shaped structure, the stuck part is a half through slot, and a through slot is further provided on the second rigid component, and the half through slot and the through slot match the projected blockers in size and number.

11. The bearing position-limiting system according to claim 1, wherein the force transferring part is provided with a stuck part cooperated with the position-limiting projection.

12. The bearing position-limiting system according to claim 11, wherein the position-limiting projection is in a form of a plurality of projected blockers arranged along the circumference, and the force transferring part is a tapered ring-shaped structure, and the stuck part is a half through slot, and a through slot is further provided in the force transferring part, and the half through slot and the through slot match the projected blockers in size and number.

13. The bearing position-limiting system according to claim 1, wherein the force transferring part is at least one integrally formed circular ring and/or at least one multi-piece snapping circular ring.

* * * * *